United States Patent [19]

Hoshi et al.

[11] 4,119,061

[45] Oct. 10, 1978

[54] METHOD AND EQUIPMENT FOR CONTROL OF INTERNAL COMBUSTION ENGINE INCLUDING A FUEL-REFORMING DEVICE

[75] Inventors: Hirohiko Hoshi; Toshio Funayama; Kazuhiko Ishiguro, all of Toyota; Hidetomo Umehara, Susono, all of Japan

[73] Assignee: Toyota Jidosha Kogyo Kabushiki Kaisha, Japan

[21] Appl. No.: 803,948

[22] Filed: Jun. 6, 1977

[30] Foreign Application Priority Data

Nov. 18, 1976 [JP] Japan .................... 51-138648

[51] Int. Cl.$^2$ ............................ F02B 43/08
[52] U.S. Cl. .............................. 123/3; 123/127; 123/DIG. 12; 123/121; 48/212
[58] Field of Search ............ 123/3, 127, DIG. 12, 123/121; 48/212

[56] References Cited

U.S. PATENT DOCUMENTS

| 1,966,345 | 7/1934 | Harrel | 123/121 |
| 4,002,151 | 1/1977 | Toyoda | 123/3 |
| 4,026,248 | 5/1977 | Lee | 123/3 |
| 4,059,076 | 11/1977 | Kosaka | 123/3 |

FOREIGN PATENT DOCUMENTS 2,322,688 11/1974 Fed. Rep. of Germany ......... 123/121

Primary Examiner—Ronald H. Lazarus
Attorney, Agent, or Firm—Oblon, Fisher, Spivak, McClelland & Maier

[57] ABSTRACT

Method and equipment for control of an internal combustion engine including a fuel-reforming device includes appropriate control of the ratio of total air to total fuel supplied to the internal combustion engine through mechanical regulation of the volume of air to pass through the fuel-reforming device in accordance with the volume of air to be sucked into the engine without passing through the fuel-reforming device, suction being done utilizing the negative pressure downstream of the throttle valve; through electrical regulation of the volume of fuel to be supplied to the air passing through the fuel-reforming device in accordance with the volume of the air; and through electrical control of a separate fuel-supply provided in the air path which does not run through the fuel-reforming device and of a fuel-supply which runs through the fuel-reforming device.

11 Claims, 4 Drawing Figures

METHOD AND EQUIPMENT FOR CONTROL OF INTERNAL COMBUSTION ENGINE INCLUDING A FUEL-REFORMING DEVICE

BACKGROUND OF THE INVENTION

1. Field of the Invention

The present invention relates to a method and equipment for control of fuel and air to be supplied to an internal combustion engine comprising a fuel-reforming device.

2. Description of the Prior Art

It is known that when an internal combustion engine is supplied with a hydrogen-containing gas from a fuel-reforming device, a very "lean" combustion is made possible, thereby reducing the harmful exhaust gas. For the purpose of reforming the fuel, the so-called partial oxidation method, in which the air and hydrocarbons are made to react on the catalyst bed under the condition of very little air, is often adopted. According to this method, the ratio of air to fuel to be supplied to the fuel-reforming device and the air excess rate in the engine have their optimum values. For the purpose of optimizing these two values, various methods of electrical or mechanical control have been employed.

Although the conventional method of electrical control is capable of relatively accurate control, it leaves much to be improved because it requires a complicated, bulky apparatus including a feedback circuit. When the ratio of air to hydrocarbons to be delivered to the fuel-reforming device is mechanically controlled by means of the carburetor, the apparatus can be made less bulky than in the electrical method. Under the condition of extremely little air, for example, the weight ratio of air to hydrocarbons being less than 3, only unreliable and rough control can be made. This adverse effect emerges in the air excess rate of the engine which has a direct bearing on the harmful contents of the exhaust gas or the fuel consumption rate.

SUMMARY OF THE INVENTION

A main object of the present invention is to provide a method and equipment for control of an internal combustion engine with a fuel-reforming device in which the electrical control unit is made compact and simple through adoption of mechanical control to be coupled with electrical control.

Another object of the present invention is to provide a method and equipment for control of an internal combustion engine with a fuel-reforming device wherein the fuel-reforming device is intended mainly for use in a partial load range where service is required often such as when running through urban areas. In this load range, the internal combustion engine yields very little harmful exhaust gas. Therefore, the performance of the engine in the high load range is not sacrificed.

Still another object of the present invention is to provide a method and equipment for control of an internal combustion engine with a fuel-reforming device wherein the combustion of the mixed gas takes place usually in the "lean" range and the heat loss in the fuel-reforming device is redeemed through an increase in the thermal efficiency of the engine, thereby holding down the total fuel consumption.

Still another object of the present invention is to provide a method and equipment for control of an internal combustion engine with a fuel-reforming device wherein the temperature in the fuel-reforming device which becomes extremely hot with an increased supply of materials is prevented from rising to an excessively high value by holding the volume of the supply to a necessary minimum, thereby increasing the durability of the fuel-reforming device.

Still another object of the present invention is to provide a method and equipment for control of an internal combustion engine with a fuel-reforming device wherein the engine can run even when the air supply to the fuel-reforming device drops or ceases or even when the fuel-reforming device loses its function.

Still another object of the present invention is to provide a method and equipment for control of an internal combustion engine with a fuel-reforming device wherein the air supply to the fuel-reforming device is done mainly by utilizing the negative pressure in the suction pipe, thereby dispensing with the air pump which is usually required.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings in which.

DETAILED DESCRIPTION OF THE PREFERRED EMBODIMENTS

The method according to the present invention comprises sucking the air into the engine without passing through the fuel-reforming device; sucking the air, utilizing the negative pressure downstream of a throttle valve, through the fuel-reforming device, into the air which has not passed through the fuel-reforming device, the throttle valve serving to control the flow rate of the air; regulating the flow rate of the air passing through the fuel-reforming device in accordance with the flow rate of the air not passing through the fuel-reforming device by interlocking the throttle valve with a valve to control the flow rate of the air not passing through the fuel-reforming device; detecting the flow rate of the air passing through the fuel-reforming device, electrically calculating the volume of fuel to be supplied to the fuel-reforming device in accordance with the detected flow rate of the air, and supplying the calculated volume of fuel to the air passing through the fuel-reforming device; reacting the fuel with the air passing through the fuel-reforming device in the fuel-reforming device, thereby yielding a reformed gas; and calculating the flow rate of the air not passing through the fuel-reforming device, finding the total volume of air sucked into the engine from the sum of the calculated air volume and the detected volume of the air passing through the fuel-reforming device, electrically calculating the necessary volume of fuel for the total air volume, whereby a lack in the fuel is corrected by supplying the necessary amount of fuel to the air not passing through the fuel-reforming device and an excess in the fuel is corrected by reducing the fuel to be supplied to the air passing through the fuel-reforming device.

Mechanical regulation of the volume of air passing through the fuel-reforming device may be done upstream of the fuel-reforming device or downstream of it.

For the purpose of increasing the accuracy of measuring the flow rate of the air passing through the fuel-reforming device, in addition to a flow-meter to measure the flow of the air passing through the fuel-reforming device, a pressure-detecting means may be provided so that a signal thereof may be sent to the controller and correction may be made with this signal.

The ratio of total air to total fuel to be supplied to the engine is thus controlled such that the combustion in the engine may take place in the "lean" range, thereby reducing the harmful exhaust gas and improving the thermal efficiency of the engine.

Figure 1:
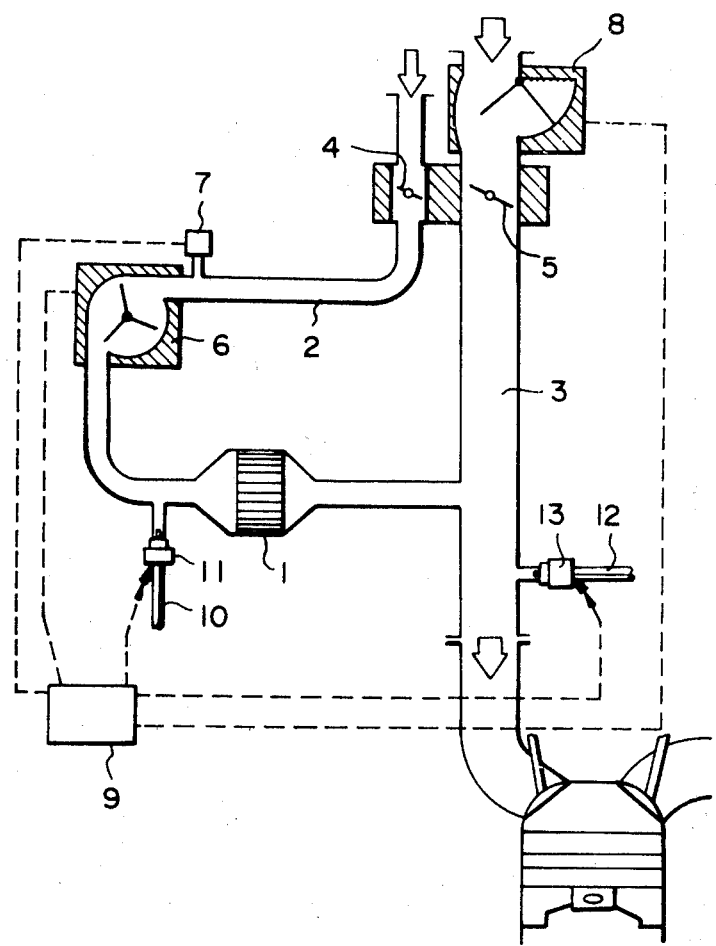
FIG. 1 illustrates a system according to the first embodiment of the present invention.

An example of the method according to the present invention is shown in FIG. 1 which illustrates a system as the first embodiment of the present invention. In this system, the internal combustion engine is supplied with the air sucked through the air path (suction pipe) 3 without passing through the fuel-reforming device 1; the fuel which is supplied to the air from a supply system if necessary; the air sucked into the air which has not passed through the fuel-reforming device 1 downstream of a throttle valve 5 which controls the air; and the fuel which is supplied to the air passing through the fuel-reforming device 1, upstream of the fuel-reforming device 1.

This system in which the air supply to the fuel-reforming device 1 takes place through suction under the negative pressure developed downstream of the valve 5 of the suction pipe 3 does not require an air pump which is conventionally provided in the air supply path 2 to the fuel-reforming device 1. Of course, such an air pump may be provided if it desirably enlarges the applicabilities of the fuel-reforming device 1.

There is a valve 4 in the air supply path 2 to the fuel-reforming device 1. The valve 4 and the valve 5 are mechanically interlocked by, for example, a linkage, whereby the control of the air passing through the fuel-reforming device 1 is mechanically associated with the control of the air not passing through it. Since this interlocking is mechanical, the control device can be compact and simple as compared with the conventional one using an electrical method of control.

The volume of the air supplied to the fuel-reforming device 1 is measured by the air volume sensor 6 installed in the air path 2, while its pressure is measured by the pressure sensor 7, thereby helping correct the value measured by the air volume sensor 6. The values thus measured are sent as electric signals to the controller 9. Thus, the necessary fuel supply to the fuel-reforming device 1 matching the measured air volume is found and the necessary volume of fuel is supplied by working the magnetic valve 11 in the fuel supply pipe 10 to supply the fuel downstream of the air volume sensor 6 in the air path 2.

The air and fuel supplied to the fuel-reforming device 1 are partially oxidized on the catalyst bed and a reformed gas thus produced which contains much hydrogen is sucked into the air path 3.

On the other hand, the air volume sensor 8 provided in the air path 3 detects the flow rate of the air not passing through the fuel-reforming device 1, the detected value being transmitted as an electric signal to the controller 9, where the total air volume sucked into the engine is found from the signal of the sensor 8 and the signals of the sensors 6 and 7. Then, the lack or excess of fuel is determined in comparison with the predetermined necessary volume for the total air volume. In the case of a deficiency, a magnetic valve 13 provided in the fuel supply pipe 12 to supply the fuel without passing through the fuel-reforming device 1 is operated, thereby directly supplying the fuel to the engine without passing through the fuel-reforming device 1. In the case of an excess, fuel is supplied to air path 2 passing through the magnetic valve 11. In consideration of the ratio of the total air to the total fuel, the controller 9 works the magnetic valve 11, thereby reducing the volume of fuel passing through the magnetic valve 11 so that the ratio of total air to total fuel may meet the preset value. The preset value is decided so that the combustion in the engine may take place in the "lean" range, thereby reducing the harmful exhaust gas and improving the thermal efficiency of the engine.

Figure 2:
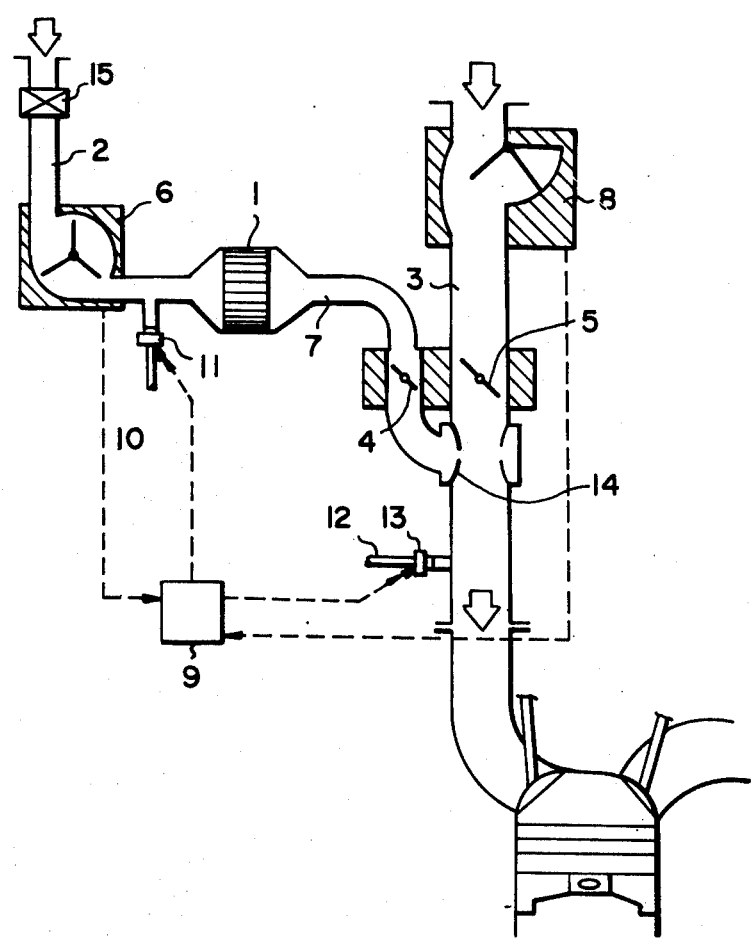
FIG. 2 illustrates a system according to the second embodiment of the present invention.

FIG. 2 illustrates the second embodiment of the present invention, where like parts are denoted by like symbols in the first embodiment and a detailed account is omitted. The air volume supplied to the fuel-reforming device 1 is detected by the air volume sensor 6 provided in the air path 2. The controller 9 activates the magnetic valve 11 in the fuel pipe 10, whereupon the volume of fuel matching the volume of air passing through the air path 2 is supplied downstream of the air volume sensor 6 in the air path 2 and upstream of the fuel-reforming device 1. Hydrogen-containing reformed gas produced through reaction in the fuel-reforming device 1 is adjusted in its flow rate by the valve 4 mechanically interlocked with the valve 5 provided in the air suction pipe 3 midway in the path 7 of the reformed gas and is mixed in the mixer 14 provided in the air path 3 downstream of the valve 5 (in the example of FIG. 1, a mixer is not shown but, of course, one may be provided) and is then delivered to the engine.

Sensing the total air volume supplied to the engine upon the signal from the air volume sensor 8 in the pipe 3 upstream of the valve 5 and the signal from the air volume sensor 6 in the air path 2, the controller 9 determines a lack or excess of fuel through comparison with the present ratio of total air to total fuel. In the case of a deficiency, the necessary fuel is supplied into the air or the mixed gas containing the hydrogen-containing reformed gas in the pipe 3, downstream of the valve 5, by operating the magnetic valve 13 provided in the fuel supply pipe 12. In the case of an excess, the magnetic valve 11 is operated to reduce the fuel supply to the fuel-reforming device 1, so that the preset value can be met. The valve 15 functions to close the air path 2 at the same time the engine stops and it is essential for the purpose of preventing a release of the reformed gas into the atmosphere in the present example in which there is no valve 4 upstream of the fuel-reforming device in the air path 2.

Figure 3:
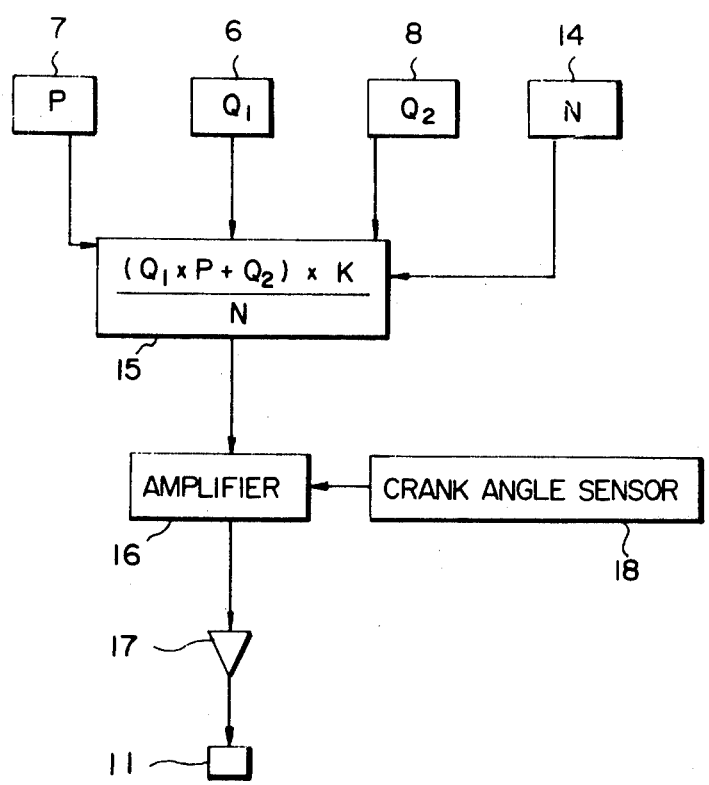
FIG. 3 is a block diagram illustrating a controller in the first embodiment.

Description will now be made of the arithmetic circuit in the controller 9 employed in the first and second embodiments of the present invention. The arithmetic circuit in the first embodiment is described referring to FIG. 3. The signal $Q_1$ proportional to the air volume from the air volume sensor 6 to the fuel-reforming device, the signal P proportional to the pressure of air from the pressure sensor 7, the signal $Q_2$ proportional to the air volume from the air volume sensor 8 of the engine, the signal N proportional to the number of revolutions from the engine rpm sensor 14 and the factor K to determine the air/fuel ratio of the engine are transformed to a signal $(Q_1 \times P + Q_2)/(N) \times K$ in the arithmetic unit 15 and this signal activates the injector 17 via the amplifier 16. Upon the action of the injector 17, the magnetic valve 11 opens to supply the fuel to the air path 2.

The amplifier 16, upon sensing the crank shaft position from the crank angle sensor 18, starts the action of the injector 17, whereby its action continues for a period depending on the signal from the arithmetic unit 15.

Figure 4:
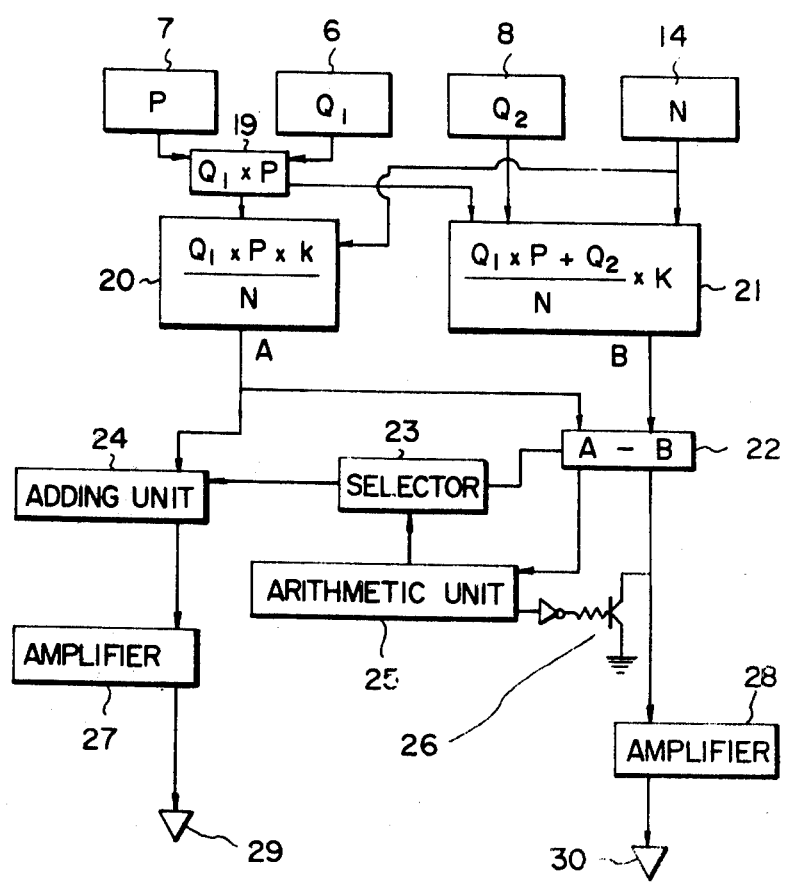
FIG. 4 is a block diagram illustrating a controller in the second embodiment.

The function of the controller arithmetic circuit in the second embodiment is described with reference to FIG. 4. The signal P proportional to the pressure of air supplied to the fuel-reforming device by the pressure sensor 7 and the signal $Q_1$ proportional to the air volume from the air volume sensor of the reforming device are transformed to a signal $Q_1 \times P$ in the arithmetic unit 19. This signal, the signal N from the engine rpm sensor 14 and the factor K to determine the air/fuel ratio in the reforming device are transformed to a signal $(Q_1 \times P \times K)/(N)$ in the arithmetic unit 20.

Meanwhile, the signal generated in the arithmetic unit 19, the signal $Q_2$ proportional to the air volume from the air volume sensor 8, the signal N, and the factor K to determine the air/fuel ratio in the engine are transformed to a signal $(Q_1 \times P + Q_2)/(N) \times K$ in the arithmetic unit 21. Then, the signal A from the arithmetic unit 20 and the signal B from the arithmetic unit 21 are transformed to a signal $A - B$ in the subtracting unit 22. If this signal is positive, the arithmetic unit 25 acts on the selector 23, whereupon the signal to the adding unit 24 is made zero and the signal A, i.e., $(A + 0 = A)$ is transmitted to the amplifier 27 to activate the injector 29. On the other hand, the transistor 26 does not act, while the amplifier 28 acts, depending on the value of the signal $A - B$. If $A - B$ is negative, the unit 25 causes the transistor 26 to act, thereby grounding the signal to the amplifier 28 and stopping the action of the injector 30. In the meantime, the signal $A - B$ is sent from the selector 23 to the adding unit 24. Addition of the negative signal makes the signal to the amplifier 27 much smaller by the value thereof and, in consequence, the action of the injector 29 is controlled.

The pressure sensor 7 may be omitted, and, in that case, the signal P is invariably 1. The factor $k$ to determine the air/fuel ratio in the reforming device remains constant, but the factor K to determine the air/fuel ratio in the engine, which has a great influence on the composition of exhaust gas and the thermal efficiency of the engine, may be varied as a function of the engine rpm and load. If the injector 30 is appropriately designed such that it can act in practically the whole operational range, in other words, the value $A - B$ is active in practically the whole range, the engine can be operated all the time in good condition regardless of the reforming device which is liable to be slow in response to sudden acceleration or deceleration.

The action in the above two embodiments will now be described. The controllable range of air/fuel ratios in the fuel-reforming device 1 depends mainly on the catalyst. But, if the device is used in an appropriate range, a reformed gas with superior combustibility in the range of 2 - 6 will be produced. According to the invention, the air/fuel ratio in the fuel-reforming device 1 is electrically controlled and therefore it can be stable in practically the whole range. When it is necessary to supply the fuel to the fuel-reforming device 1 at a modified ratio of air to fuel in the device, the modified ratio of air to fuel is liable to become somewhat high and, for this reason, the preset value is desirably selected low. Since usually the air/fuel ratio in the fuel-reforming device 1 is set at about 3, deviation from the allowable range is not likely.

The difference between the first and the second embodiments lies in whether the air supply to the fuel-reforming device 1 is controlled as the volume of the air before entering the fuel-reforming device 1 or the flow rate of a reformed gas is controlled. This means that, in the first embodiment, the reaction in the fuel-reforming device takes place under a pressure lower than the atmospheric pressure, while in the second embodiment, the reaction takes place under approximately atmospheric pressure. The difference in the relative position of the sensor 6 to the valve 4 is not essential.

Regardless of whether the air pump is employed or not, the air supply to the fuel-reforming device 1 is subject to the effect of the negative pressure downstream of the valve 5 in the engine suction pipe 3. When the operator, trying to increase the output, opens the valve 5, the pressure downstream of the valve 5 in the air path 3 approaches the atmospheric pressure and, in consequence, the ratio of the air volume $q_1$ in the air path 2 to the air volume $q_2$ in the air path 3, i.e., $C = q_1/q_2$ becomes small beyond a certain range. If the volume of fuel flowing through the valve 11 is $f_1$, the air/fuel ratio in the fuel-reforming device, $a_1 = q_1/f$ is constant, and the ratio $a_2$, i.e., the total air volume $(q_1 + q_2)$ / the total fuel volume $(f_1 + f_2)$ including the fuel volume $f_2$ flowing through the valve 13 is constant. Then the following relations hold:

$$c = q_1/q_2 \qquad (1)$$

$$a_1 = q_1/f_1 \qquad (2)$$

$$a_2 = (q_1 + q_2)/(f_1 + f_2) \qquad (3)$$

Assuming $a_1/a_2 = a$, $f_2/f_1 = f$, then from (1) (2) (3) is realized $t = a/c + a - 1$ \qquad (4)

Thus $t$ increases with a decrease in $c$, in other words, $f_2$ increases more than $f_1$. Accordingly, the fuel to the fuel-reforming device 1 diminishes, while the fuel directly supplied to the air path 3 increases. In this case, the fuel to burn in the engine has a high calorific value per unit volume. This means that, when the operator opens the valve 5 to increase the output, a fuel with a higher calorific value per unit volume is delivered to the engine, thereby enhancing the performance of the engine. On the contrary, during running through urban areas when the valve 5 is half-open, the volumes of fuel and air passing through the fuel-reforming device 1 increase and, as a result of an increase in the reformed gas, the harmful contents in the exhaust gas drop.

The value of $f_2/f_1$ changes depending on the manner in which the valves 5 and 4 are interlocked. Therefore, the mechanical interlocking mechanism of the valves 5 and 4, for instance a linkage, and the structures of the valves 5 and 4 themselves are designed and built taking this into account. Basically, however, the performance is satisfactory as mentioned above and therefore it is not necessary to be so cautious in designing for a high load. In a time of low loading or when an air pump is employed, the opening at the valves 5 and 4 and the value of $f_2/f_1$ may reverse the above-mentioned tendency. In that case, even if the valves 5 and 4 have been designed to have desirable characteristics, the performance may as mentioned above, depend on the opening degrees of the valves 5 and 4.

Thus, the present invention yields the following effects:

(a) Being a combination of electrical and mechanical controls, the method according to the present invention makes it possible to produce a compact, inexpensive device with a required capacity and maintenance of a high ratio of total air to total fuel sucked into the engine.

(b) According to the present invention, an appropriate fuel control can be made under any working condition of the engine, because the volume of fuel passing through the fuel-reforming device can be increased during frequent use of the fuel-reforming device, thereby enabling combustion with an extremely low harmful content of exhaust gas, and, under high load, the volume of fuel not passing through the fuel-reforming device can be increased to increase the output.

(c) According to the present invention in which the volume of fuel to be supplied to the fuel-reforming device and the total volume of fuel to be supplied to the engine can be appropriately controlled depending on the air volume, the unavoidable heat loss in the fuel-reforming device can be compensated for by an increased efficiency of the engine, thereby minimizing the fuel consumption.

(d) According to the present invention in which the fuel can be supplied under electrical control to the fuel-reforming device, it is possible to hold to the necessary minimum the temperature of the fuel-reforming device which is otherwise liable to become very hot, thereby increasing the durability of the fuel-reforming device.

(e) According to the present invention wherein there is provided a system of supplying the air and fuel to the engine without passing through the fuel-reforming device, the engine can run with safety even when trouble occurs in the fuel-reforming device and the function of this device is lost.

(f) According to the present invention in which a reformed gas generated in the fuel-reforming device is sucked in utilizing the negative pressure in the suction pipe of the engine, no special air pump is needed on the air suction side of the fuel-reforming device although such a pump may be provided. Thus, the device can be made more compact.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A method for control of an internal combustion engine with a fuel-reforming device comprising:
   sucking the air into the engine without passing through the fuel-reforming device;
   sucking the air through the fuel-reforming device into the air not having passed the fuel-reforming device, downstream of the throttle valve utilizing the negative pressure developed downstream of the throttle valve;
   mechanically controlling the air flow through the fuel-reforming device in accordance with the volume of the air not passing through the fuel-reforming device by interlocking the valve for controlling the flow rate of the air not passing through the fuel-reforming device, with the throttle valve;
   detecting the volume of the air passing through the fuel-reforming device and electrically controlling the volume of fuel to be supplied to the fuel-reforming device in accordance with the detected volume of the air;
   generating a reformed gas through reaction in the fuel-reforming device of the fuel and the air passing through the fuel-reforming device; and
   detecting the flow rate of the air not passing through the fuel-reforming device, ascertaining the total air sucked into the engine from the sum of the detected air volume not passing through the fuel-reforming device and the detected air volume passing through the device, calculating the necessary volume of fuel for the total air so that, when the fuel is insufficient, a necessary volume is supplied to the air not passing through the fuel-reforming device and, when the fuel is excessive, the volume of fuel supplied to the air passing through the fuel-reforming device is reduced.

2. The method of claim 1 wherein the step of mechanically controlling the air volume passing through the fuel-reforming device occurs upstream of where the fuel is reformed in the reforming device.

3. The method of claim 1 wherein the step of mechanically controlling the air volume passing through the fuel-reforming device occurs downstream of where the fuel is reformed in the reforming device.

4. The method of claim 1 wherein the measured value of the air volume passing through the fuel-reforming device is further corrected upon a signal from a separate pressure-detecting means.

5. The method of claim 1 wherein the controlled ratio of total air to total fuel is set so that the combustion in the engine may take place in a lean range.

6. Equipment for control of an internal combustion engine with a fuel-reforming device comprising:
   a first path in which the air sucked into the engine flows;
   a throttle valve provided in the first path;
   a second path in which the air sucked into the first path flows, the second path branching off the first path at a position downstream of the throttle valve;
   a fuel reforming device provided in the second path;
   a valve mechanically interlocked with the throttle valve provided in the second path, the valve functioning to control the air flow through the second path in accordance with the air flow through the first path;
   a first flowmeter provided in the first path to detect the air flow through the first path;
   a second flowmeter provided in the second path to detect the air flow through the second path;
   a first fuel supply pipe branchingly provided in the first path and a first fuel volume control valve provided in the first fuel supply pipe;
   a second fuel supply pipe provided in the second path and branching upstream of the fuel-reforming device and a second fuel volume control valve provided in the second fuel supply pipe; and
   a controller to electrically control the volume of fuel to be supplied to the fuel-reforming device upon a signal of the air flow through the second path from the second flowmeter and to ascertain the total air volume to be sucked into the engine from a signal of the air flow through the first path from the first flowmeter and the signal of the air flow through the second path so that the necessary fuel for the total air volume can be supplied, whereby, when the fuel is insufficient, a necessary volume is provided by the fuel passing through the first fuel supply pipe and, when the fuel is excessive, the volume of fuel passing through the second fuel supply pipe is reduced.

7. Equipment in accordance with claim 6 wherein the valve provided in the second path is located upstream of the fuel-reforming device.

8. Equipment in accordance with claim 6 wherein the valve provided in the second path is located downstream of the fuel-reforming device.

9. Equipment in accordance with claim 7 wherein a pressure gauge is provided in the second path in addition to the second flowmeter and a signal from the pressure gauge is transmitted to the controller to enhance the accuracy of measuring the air flow through the second path.

10. Equipment in accordance with claim 6 wherein a mixer is provided at the branching point of the second path from the first path.

11. Equipment in accordance with claim 8 wherein a valve to shut the second path upon a stopping of the engine is provided upstream of the fuel-reforming device in the second path.

* * * * *